US012678765B2

(12) United States Patent
Nam et al.

(10) Patent No.: US 12,678,765 B2
(45) Date of Patent: Jul. 14, 2026

(54) LEAKAGE-PREVENTING HIGH PERFORMANCE DESICCANT COMPOSITION AND PREPARATION METHOD THEREFOR

(71) Applicant: KOREA UNIVERSITY OF TECHNOLOGY AND EDUCATION INDUSTRY-UNIVERSITY COOPERATION FOUNDATION, Cheonan-si (KR)

(72) Inventors: Byeong Uk Nam, Asan-si (KR); Jin Woo Bae, Gyeonggi-do (KR); Jong In Lee, Cheongju-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 690 days.

(21) Appl. No.: 18/011,196

(22) PCT Filed: Nov. 27, 2020

(86) PCT No.: PCT/KR2020/017181
§ 371 (c)(1),
(2) Date: Dec. 19, 2022

(87) PCT Pub. No.: WO2022/050506
PCT Pub. Date: Mar. 10, 2022

(65) Prior Publication Data

US 2023/0226517 A1 Jul. 20, 2023

(30) Foreign Application Priority Data

Sep. 2, 2020 (KR) ........................ 10-2020-0111879
Sep. 9, 2020 (KR) ........................ 10-2020-0115099

(51) Int. Cl.
*B01J 20/04* (2006.01)
*B01J 20/24* (2006.01)
(Continued)

(52) U.S. Cl.
CPC ............. *B01J 20/046* (2013.01); *B01J 20/24* (2013.01); *B01J 20/28047* (2013.01); *B01J 20/3085* (2013.01); *B01J 2220/46* (2013.01)

(58) Field of Classification Search
CPC .... B01J 20/046; B01J 20/24; B01J 20/28047; B01J 20/3085; B01J 2220/46;
(Continued)

(56) References Cited

U.S. PATENT DOCUMENTS

2003/0110981 A1* 6/2003 Tsuruoka ................ C07F 5/069
257/E23.137
2018/0353931 A1 12/2018 Hyung et al.

FOREIGN PATENT DOCUMENTS

CN 101549243 A 10/2009
CN 103898346 A * 7/2014
(Continued)

OTHER PUBLICATIONS

International Search Report of PCT/KR2020/017181 mailed May 31, 2021.

*Primary Examiner* — Anthony J Zimmer
*Assistant Examiner* — Jaanzeb C Raja
(74) *Attorney, Agent, or Firm* — Revolution IP, PLLC

(57) ABSTRACT

The present invention relates to a leakage-preventing high performance desiccant composition and a preparation method therefor, wherein a solid desiccant composition includes calcium chloride ($CaCl_2$), magnesium chloride ($MgCl_2$), and metal oxide, wherein the metal oxide may be calcium oxide (CaO), and a gel desiccant composition includes metal chloride and an absorbent polymer, wherein
(Continued)

the metal chloride may be calcium chloride ($CaCl_2$) and magnesium chloride ($MgCl_2$), and the absorbent polymer may be CMC (carboxymethyl cellulose).

1 Claim, 4 Drawing Sheets

(51) Int. Cl.
*B01J 20/28* (2006.01)
*B01J 20/30* (2006.01)

(58) Field of Classification Search
CPC .. B01J 2220/42; B01J 2000/44; B01J 20/041; B01J 20/262; B01J 20/30; B01D 2251/402; B01D 2251/404; B01D 53/28; B01D 53/261
See application file for complete search history.

(56) References Cited

FOREIGN PATENT DOCUMENTS

| | | | | | |
|---|---|---|---|---|---|
| CN | 104319634 | A | * | 1/2015 | ............. B01D 53/26 |
| JP | 11-151417 | A | | 6/1999 | |
| KR | 10-1994-0002336 | A | | 2/1994 | |
| KR | 10-1276753 | B1 | | 6/2013 | |
| KR | 10-2017-0076082 | A | | 7/2017 | |
| KR | 10-1760304 | B1 | | 7/2017 | |
| KR | 20200121132 | A | * | 10/2020 | ........... B65D 81/264 |
| KR | 20220033119 | A | * | 3/2022 | .............. B01J 20/26 |
| WO | WO-9847978 | A1 | * | 10/1998 | ............. C09K 3/185 |
| WO | 02-32569 | A1 | | 4/2002 | |

* cited by examiner

LEAKAGE-PREVENTING HIGH PERFORMANCE DESICCANT COMPOSITION AND PREPARATION METHOD THEREFOR

CROSS REFERENCE TO PRIOR APPLICATIONS

This application is a National Stage Application of PCT International Patent Application No. PCT/KR2020/017181 filed on Nov. 27, 2020, under 35 U.S.C. § 371, which claims priority to Korean Patent Application Nos. 10-2020-0111879 filed on Sep. 2, 2020 and 10-2020-0115099 filed on Sep. 9, 2020, respectively, which are all hereby incorporated by reference in their entirety.

TECHNICAL FIELD

The present invention relates to a leakage-preventing high performance desiccant composition and a preparation method therefor. The present invention, more particularly, relates to a solid desiccant composition and a preparation method therefor, and a gel desiccant composition and a preparation method therefor.

BACKGROUND ART

Desiccants are agents serving to absorb moisture in the air by including materials having a high affinity for moisture. The desiccants mainly include calcium chloride and are used as dehumidifying agents to remove moisture in the air, drying agents, and deicing agents to prevent frozen ground in winter.

However, typical desiccants including calcium chloride cause leakage in which absorbed moisture leaks out, and accordingly, surrounding objects get wet to bring about corrosion in electronic, precision, and optical products.

Korean Patent Publication No. 10-1994-0002336, which is a prior art document, mixes calcium chloride, minerals, oxides, and other additives and limits the amount of each component to provide an affordable and highly absorbent desiccant.

DISCLOSURE OF THE INVENTION

Technical Problem

The present invention provides a desiccant composition having high moisture absorption and a preparation method thereof.

In addition, the desiccant composition according to an embodiment of the present invention is economical due to reduced preparation costs.

In addition, a solid desiccant composition may prevent leakage through a moisture curing reaction.

In addition, a gel desiccant composition may form a high-viscosity gel to prevent leakage.

Technical Solution

A solid desiccant composition according to an embodiment of the present invention includes calcium chloride ($CaCl_2$), magnesium chloride ($MgCl_2$), and metal oxide.

A method of preparing a solid desiccant composition according to an embodiment of the present invention includes mixing calcium chloride, magnesium chloride, and metal oxide to prepare a mixture, and subjecting metal oxide included in the mixture to a hydration reaction to generate metal hydroxide.

A gel desiccant composition according to an embodiment of the present invention includes calcium chloride ($CaCl_2$), magnesium chloride ($MgCl_2$), and an absorbent polymer.

A method of preparing a gel desiccant composition according to an embodiment of the present invention includes mixing calcium chloride, magnesium chloride, and an absorbent polymer to prepare a mixture, and forming a bond between metal cations of the calcium chloride and the magnesium chloride and hydrophilic anions of the absorbent polymer for gelation.

Advantageous Effects

A desiccant composition according to an embodiment of the present invention has high moisture absorption.

In addition, the desiccant composition according to an embodiment of the present invention is economical due to reduced preparation costs.

In addition, a solid desiccant composition may prevent leakage through a moisture curing reaction.

In addition, a gel desiccant composition may form a high-viscosity gel to prevent leakage.

MODE FOR CARRYING OUT THE INVENTION

Solid Desiccant Composition and Preparation Method Therefor

A solid desiccant composition according to an embodiment of the present invention includes calcium chloride ($CaCl_2$), magnesium chloride ($MgCl_2$), and metal oxide.

Figure 1:
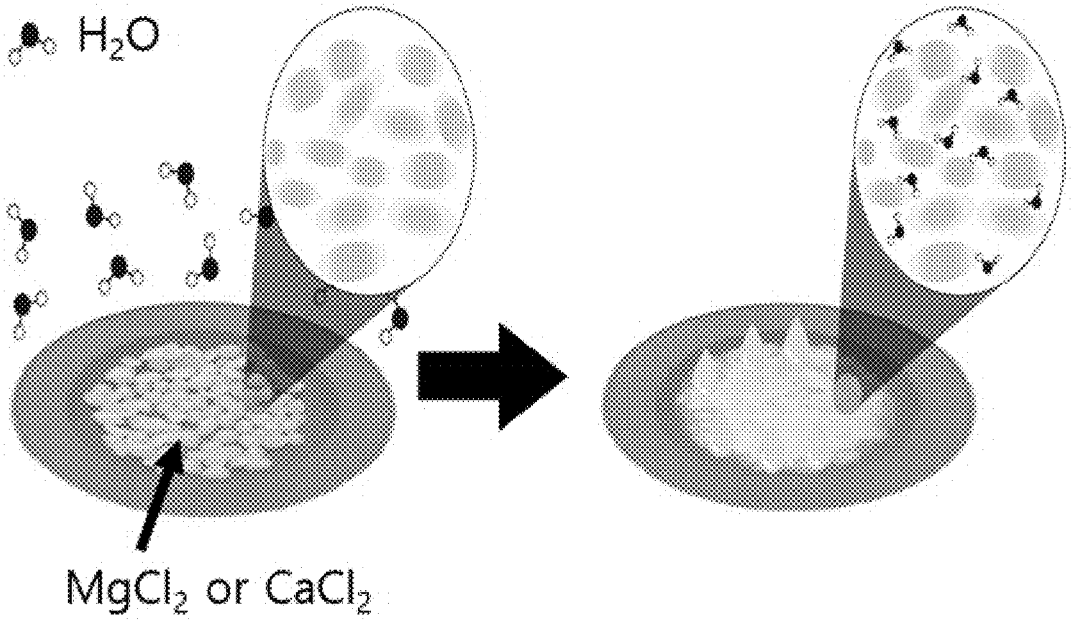
FIG. 1 shows a process in which a single ion salt of calcium chloride or magnesium chloride absorbs moisture through deliquescence.
Figure 2:
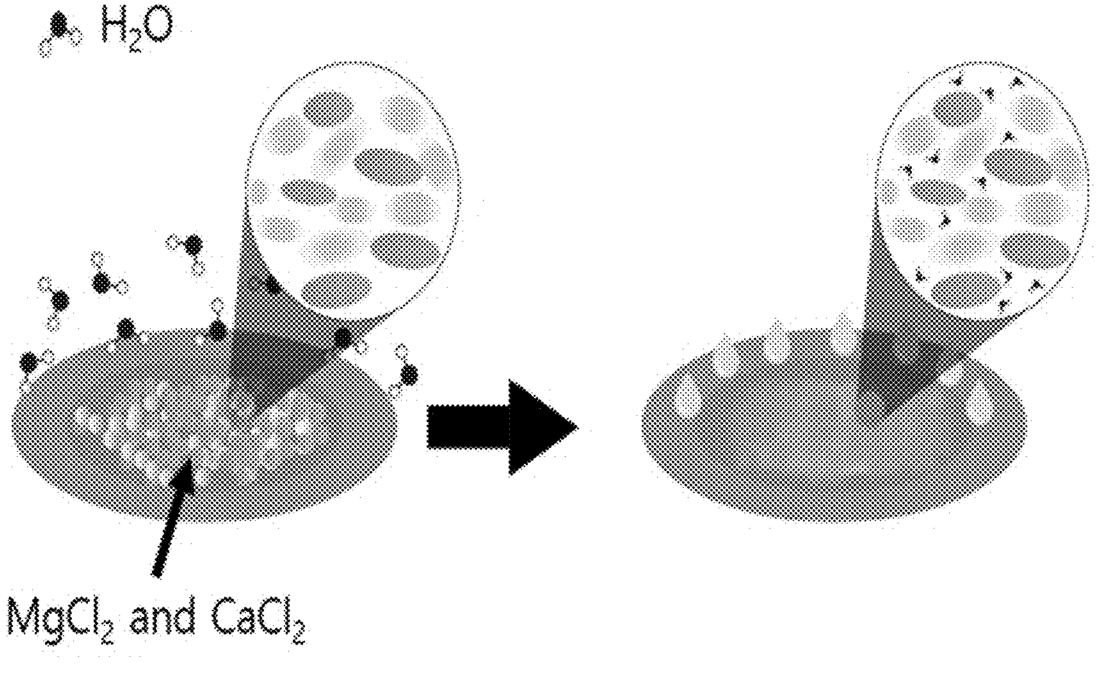
FIG. 2 shows a process in which a complex ion salt formed of calcium chloride and magnesium chloride absorbs moisture through deliquescence.

Calcium chloride ($CaCl_2$) and magnesium chloride ($MgCl_2$) may be prepared through various methods, and are not particularly limited. Calcium chloride ($CaCl_2$) and magnesium chloride ($MgCl_2$) have deliquescent properties that absorb moisture in the air (see FIGS. 1 and 2).

A mass ratio of the calcium chloride and the magnesium chloride may be 1:1 to 1:10, preferably 1:2.3 to 1:9.5, and most preferably 1:8.5 to 9.5. When calcium chloride is included in an excessively high amount, moisture absorption may decrease, and when magnesium chloride is included in an excessively high amount, preparation costs rise.

The metal oxide may be calcium oxide (CaO), magnesium oxide (MgO), or the like, but may preferably be calcium oxide (CaO). When magnesium oxide (MgO) is used, the curing rate is relatively slower than the curing rate shown when calcium oxide (CaO) is used, and some uncured materials may remain, leading to deterioration in quality. This may be prevented by using calcium oxide.

The metal oxide is mixed with calcium chloride ($CaCl_2$) and magnesium chloride ($MgCl_2$) to serve to form the mixture into a solid, and may prevent leakage.

A mass ratio of a sum of the calcium chloride and the magnesium chloride, and the metal oxide may be 1:0.5 to 1:4, more preferably 1:0.5 to 1:2. When metal oxide is included in an excessively low amount, solidification may not be performed well or leakage may be less prevented. When metal oxide is in an excessively high amount, moisture absorption may decrease.

A method of preparing a solid desiccant composition according to an embodiment of the present invention includes mixing calcium chloride, magnesium chloride, and metal oxide to prepare a mixture, and subjecting metal oxide included in the mixture to a hydration reaction to generate metal hydroxide.

In this case, descriptions of calcium chloride, magnesium chloride, and metal oxide may be the same as those described above.

In the preparing of the mixture, the mixing method is not particularly limited as long as calcium chloride, magnesium chloride, and metal oxide are mixed to be uniformly dispersed.

In the subjecting of metal oxide included in the mixture to a hydration reaction to generate metal hydroxide, the metal oxide may be formed into metal hydroxide through a hydration reaction by water absorbed by calcium chloride and magnesium chloride.

Figure 3:
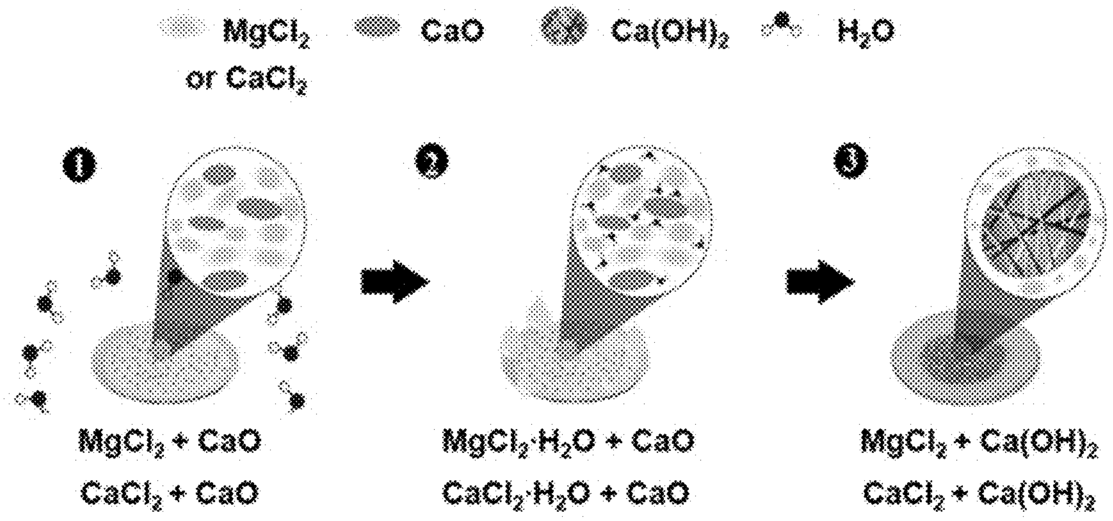
FIG. 3 shows a process in which a solid desiccant formed of a single or complex ion salt of calcium chloride and magnesium chloride and metal oxide absorbs moisture to go through solidification.

In this step, the mixture may be solidified by contacting moisture in the air with calcium chloride and magnesium chloride and subjecting the absorbed moisture and the metal oxide to a hydration reaction in a high-temperature atmosphere. Specifically, calcium chloride and magnesium chloride absorb moisture to generate calcium chloride hydrate $CaCl_2{\cdot}H_2O$ and magnesium chloride hydrate $MgCl_2{\cdot}H_2O$, respectively. Metal oxide such as calcium oxide reacts with $H_2O$ of calcium chloride hydrate and magnesium chloride hydrate to generate calcium hydroxide ($Ca(OH)_2$) (see FIG. 3).

The step herein may be performed in an atmosphere of constant humidity and temperature. Humidity may be set in the range of 80 to 95% RH and at a temperature of 40 to 60° C. This may lead to stable solidification to prevent generation of residues or breakage of products.

Gel Desiccant Composition and Preparation Method Therefor

A gel desiccant composition according to an embodiment of the present invention includes calcium chloride ($CaCl_2$), magnesium chloride ($MgCl_2$), and an absorbent polymer.

Descriptions of Calcium chloride ($CaCl_2$) and magnesium chloride ($MgCl_2$) may be the same as those described above.

A mass ratio of the calcium chloride and the magnesium chloride may be 1:1 to 1:10, preferably 1:2.3 to 1:9.5, and most preferably 1:8.5 to 9.5. When calcium chloride is included in an excessively high amount, moisture absorption may decrease, and when the content of magnesium chloride is included in an excessively high amount, preparation costs rise.

The absorbent polymer may form a three-dimensional network structure to absorb moisture into the network structure through capillarity and osmotic pressure. The absorbent polymer may include hydrophilic anions, for example, $COO^-$, absorb a large amount of moisture through expanded space inside the network due to repulsive force between the anions, and form an ionic crosslinking reaction with calcium chloride and magnesium chloride to be subjected to gelation, thereby preventing leakage.

The absorbent polymer may preferably be CMC (Carboxymethyl cellulose). In this case, the CMC may be represented by Formula 1 below.

[Formula 1]

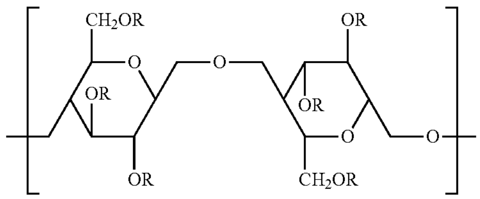

$R = H, CH_2COO^-Na^+$

A mass ratio of a sum of the calcium chloride and the magnesium chloride and the absorbent polymer may be 100:7.5 to 100:65, preferably 100:25 to 100:65, and more preferably 100:55 to 100:65. When the absorbent polymer is included in a small amount, viscosity decreases and thus leakage is less prevented, and when the absorbent polymer is included in an excessively large amount, moisture absorption may decrease.

A method of preparing a gel desiccant composition according to an embodiment of the present invention includes mixing calcium chloride, magnesium chloride, and an absorbent polymer to prepare a mixture, and forming a bond between metal cations of the calcium chloride and the magnesium chloride and hydrophilic anions of the absorbent polymer for gelation.

In this case, descriptions of calcium chloride, magnesium chloride, and an absorbent polymer may be the same as those described above.

In the preparing of the mixture, the mixing method is not particularly limited as long as calcium chloride, magnesium chloride, and an absorbent polymer are mixed to be uniformly dispersed.

The absorbent polymer may be CMC (Carboxymethyl cellulose), and in the preparing of the mixture, a mass ratio of the calcium chloride and magnesium chloride may be 1:2 to 1:10, preferably 1:2.3 to 1:9. In addition, a mass ratio of a sum of the calcium chloride and the magnesium chloride and the absorbent polymer may be 100:7.5 to 100:65, preferably 100:25 to 100:65, and more preferably 100:55 to 100:65.

Figure 4:
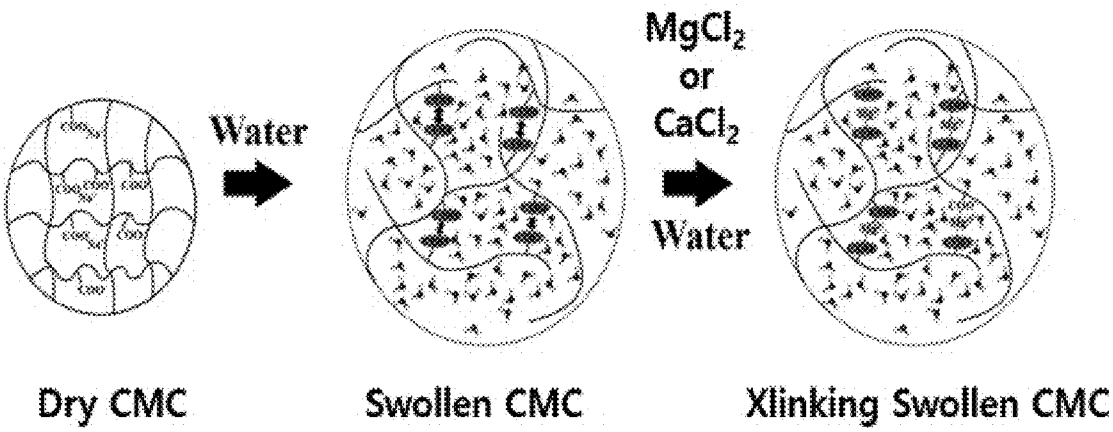
FIG. 4 shows a process in which a gel desiccant formed of a single or complex ion salt of calcium chloride or magnesium chloride and an absorbent polymer absorbs moisture and have a greater viscosity through a crosslinking reaction to form a gel.

Referring to FIG. 4, in the forming of a bond between metal cations of calcium chloride and magnesium chloride and hydrophilic anions of an absorbent polymer for gelation, physical crosslinking may be formed between the absorbent polymer and the calcium chloride and magnesium chloride. The physical crosslinking indicates that an ionic crosslinking reaction takes place between the anions of the absorbent polymer and the metal cations of calcium chloride and magnesium chloride, and accordingly, molecules are bonded to each other. This increases viscosity of a desiccant to bring about gelation.

To this end, the step herein may include maintaining the temperature of a mixture to be 40 to 60° C. In this temperature range, crosslinking may be optimal. In addition, humidity may be maintained at 80 to 95% RH.

Determination of Moisture Absorption and Viscosity

Moisture absorption of a solid desiccant and a gel desiccant was obtained through the following formula after an initial weight of a sample, and a weight of a sample after reacting with moisture are determined.

$$\text{Moisture absorption (\%)}=((W_1-W_0)/W_0)\times 100$$

$W_0$: Weight of sample before reaction with moisture $W_1$: Weight of sample after reaction with moisture Viscosity of a gel desiccant was determined at 25° C. and 100 rpm, using a Brookfield viscometer.

Example 1

0.5 g of calcium chloride and 4.5 g of magnesium chloride were mixed and weighed, and then the mixture was placed in a thermo-hygrostat and kept at 50° C. and 90% RH for 120 hours to react with moisture, and then the resulting product was weighed to determine moisture absorption.

Example 2

Moisture absorption was determined in the same manner as in Example 1, except that 1.5 g of calcium chloride and 3.5 g of magnesium chloride were mixed.

Example 3

Moisture absorption was determined in the same manner as in Example 1, except that 2.5 g of calcium chloride and 2.5 g of magnesium chloride were mixed.

Example 4

Moisture absorption was determined in the same manner as in Example 1, except that 3.5 g of calcium chloride and 1.5 g of magnesium chloride were mixed.

Example 5

Moisture absorption was determined in the same manner as in Example 1, except that 4.5 g of calcium chloride and 0.5 g of magnesium chloride were mixed.

Comparative Example 1

Moisture absorption was determined in the same manner as in Example 1, except that 5 g of calcium chloride was used alone without magnesium chloride.

Comparative Example 2

Moisture absorption was determined in the same manner as in Example 1, except that 10 g of calcium chloride was used alone without magnesium chloride.

Comparative Example 3

Moisture absorption was determined in the same manner as in Example 1, except that 20 g of calcium chloride was used alone without magnesium chloride.

Comparative Example 4

Moisture absorption was determined in the same manner as in Example 1, except that 40 g of calcium chloride was used alone without magnesium chloride.

Comparative Example 5

Moisture absorption was determined in the same manner as in Example 1, except that 5 g of magnesium chloride was used alone without calcium chloride.

Comparative Example 6

Moisture absorption was determined in the same manner as in Example 1, except that 10 g of magnesium chloride was used alone without calcium chloride.

Comparative Example 7

Moisture absorption was determined in the same manner as in Example 1, except that 20 g of magnesium chloride was used alone without calcium chloride.

Comparative Example 8

Moisture absorption was determined in the same manner as in Example 1, except that 40 g of magnesium chloride was used alone without calcium chloride.

The moisture absorption of Examples 1 to 5 and Comparative Examples 1 to 8 is shown in Table 1 below.

TABLE 1

| | Calcium chloride (g) | Magnesium chloride (g) | Moisture absorption (%) |
|---|---|---|---|
| Example 1 | 0.5 | 4.5 | 473 |
| Example 2 | 1.5 | 3.5 | 454 |
| Example 3 | 2.5 | 2.5 | 438 |
| Example 4 | 3.5 | 1.5 | 425 |
| Example 5 | 4.5 | 0.5 | 412 |
| Comparative Example 1 | 5 | 0 | 394 |
| Comparative Example 2 | 10 | 0 | 408 |
| Comparative Example 3 | 20 | 0 | 416 |
| Comparative Example 4 | 40 | 0 | 420 |
| Comparative Example 5 | 0 | 5 | 410 |
| Comparative Example 6 | 0 | 10 | 425 |
| Comparative Example 7 | 0 | 20 | 442 |
| Comparative Example 8 | 0 | 40 | 460 |

Comparing Examples 1 to 5 measured using 5 g of a mixture of calcium chloride and magnesium chloride, Comparative Example 1 measured using only 5 g of calcium chloride, and Comparative Example 5 measured using only 5 g of magnesium chloride, it is seen that the moisture absorptions when calcium chloride and magnesium chloride are mixed are all high. In particular, when a mass ratio of calcium chloride and magnesium chloride is 1:1 to 1:9 (Examples 1 to 3), it is seen that the moisture absorption is significantly higher than the moisture absorptions of Comparative Examples 1 and 5.

Preparation of Solid Desiccant

Calcium oxide was added to calcium chloride and/or magnesium chloride to prepare solid desiccants whose moisture absorption was then determined for each.

Example 6

A mixture of 0.5 g of calcium chloride, 4.5 g of magnesium chloride, and 20 g of calcium oxide was prepared and weighed. Thereafter, the mixture was placed in a thermo-hygrostat and kept at 50° C. and 90% RH for 120 hours to prepare a solid desiccant, which was then weighed.

Example 7

A solid desiccant was prepared in the same manner as in Example 1, except that 1 g of calcium chloride, 9 g of magnesium chloride, and 20 g of calcium oxide were added upon preparing a mixture.

Example 8

A solid desiccant was prepared in the same manner as in Example 1, except that 2 g of calcium chloride, 18 g of magnesium chloride, and 20 g of calcium oxide were added upon preparing a mixture.

Example 9

A solid desiccant was prepared in the same manner as in Example 1, except that 4 g of calcium chloride, 36 g of magnesium chloride, and 20 g of calcium oxide were added upon preparing a mixture.

Comparative Example 9

A solid desiccant was prepared in the same manner as in Example 1, except that only 5 g of calcium chloride and 20 g of calcium oxide were used without magnesium chloride upon preparing a mixture.

Comparative Example 10

A solid desiccant was prepared in the same manner as in Example 1, except that only 10 g of calcium chloride and 20 g of calcium oxide were used without magnesium chloride upon preparing a mixture.

Comparative Example 11

A solid desiccant was prepared in the same manner as in Example 1, except that only 20 g of calcium chloride and 20 g of calcium oxide were used without magnesium chloride upon preparing a mixture.

Comparative Example 12

A solid desiccant was prepared in the same manner as in Example 1, except that only 40 g of calcium chloride and 20 g of calcium oxide were used without magnesium chloride upon preparing a mixture.

Comparative Example 13

A solid desiccant was prepared in the same manner as in Example 1, except that only 5 g of magnesium chloride and 20 g of calcium oxide were used without calcium chloride upon preparing a mixture.

Comparative Example 14

A solid desiccant was prepared in the same manner as in Example 1, except that only 10 g of magnesium chloride and 20 g of calcium oxide were used without calcium chloride upon preparing a mixture.

Comparative Example 15

A solid desiccant was prepared in the same manner as in Example 1, except that only 20 g of magnesium chloride and 20 g of calcium oxide were used without calcium chloride upon preparing a mixture.

Comparative Example 16

A solid desiccant was prepared in the same manner as in Example 1, except that only 40 g of magnesium chloride and 20 g of calcium oxide were used without calcium chloride upon preparing a mixture.

The moisture absorption of Examples 6 to 9 and Comparative Examples 9 to 16 is shown in Table 2 below.

TABLE 2

| | Calcium chloride (g) | Magnesium chloride (g) | Calcium oxide (g) | Moisture absorption (%) |
|---|---|---|---|---|
| Example 6 | 0.5 | 4.5 | 20 | 254 |
| Example 7 | 1 | 9 | 20 | 312 |
| Example 8 | 2 | 18 | 20 | 330 |
| Example 9 | 4 | 36 | 20 | 368 |
| Comparative Example 9 | 5 | 0 | 20 | 187 |
| Comparative Example 10 | 10 | 0 | 20 | 219 |
| Comparative Example 11 | 20 | 0 | 20 | 240 |
| Comparative Example 12 | 40 | 0 | 20 | 276 |
| Comparative Example 13 | 0 | 5 | 20 | 210 |
| Comparative Example 14 | 0 | 10 | 20 | 247 |
| Comparative Example 15 | 0 | 20 | 20 | 270 |
| Comparative Example 16 | 0 | 40 | 20 | 308 |

Comparing Examples 6 to 9 with Comparative Examples 9 to 16, it is seen that when a total amount of calcium chloride and/or magnesium chloride is at the same level, Examples have high moisture absorption.

Preparation of Gel Desiccant

Absorbent polymers were added to calcium chloride and/or magnesium chloride to prepare gel desiccants whose moisture absorption was then determined for each.

Example 10

0.5 g of calcium chloride, 4.5 g of magnesium chloride, and 3 g of CMC were mixed to prepare a mixture, which was then weighed, and then the mixture was placed in a thermo-hygrostat and kept at 50° C. and 90% RH for 120 hours to react with moisture, and then the resulting product was weighed to determine moisture absorption.

Example 11

Moisture absorption was determined in the same manner as in Example 10, except that 1 g of calcium chloride, 9 g of magnesium chloride, and 3 g of CMC were mixed upon preparing a mixture.

Example 12

Moisture absorption was determined in the same manner as in Example 10, except that 2 g of calcium chloride, 18 g of magnesium chloride, and 3 g of CMC were mixed upon preparing a mixture.

Example 13

Moisture absorption was determined in the same manner as in Example 10, except that 4 g of calcium chloride, 36 g of magnesium chloride, and 3 g of CMC were mixed upon preparing a mixture.

Comparative Example 17

Moisture absorption was determined in the same manner as in Example 10, except that 5 g of calcium chloride and 3 g of CMC were mixed upon preparing a mixture.

Comparative Example 18

Moisture absorption was determined in the same manner as in Example 10, except that 10 g of calcium chloride and 3 g of CMC were mixed upon preparing a mixture.

Comparative Example 19

Moisture absorption was determined in the same manner as in Example 10, except that 20 g of calcium chloride and 3 g of CMC were mixed upon preparing a mixture.

Comparative Example 20

Moisture absorption was determined in the same manner as in Example 10, except that 40 g of calcium chloride and 3 g of CMC were mixed upon preparing a mixture.

Comparative Example 21

Moisture absorption was determined in the same manner as in Example 10, except that 5 g of magnesium chloride and 3 g of CMC were mixed upon preparing a mixture.

Comparative Example 22

Moisture absorption was determined in the same manner as in Example 10, except that 10 g of magnesium chloride and 3 g of CMC were mixed upon preparing a mixture.

Comparative Example 23

Moisture absorption was determined in the same manner as in Example 10, except that 20 g of magnesium chloride and 3 g of CMC were mixed upon preparing a mixture.

Comparative Example 24

Moisture absorption was determined in the same manner as in Example 10, except that 40 g of magnesium chloride and 3 g of CMC were mixed upon preparing a mixture.

The moisture absorption of Examples 10 to 13 and Comparative Examples 17 to 24 is shown in Table 3 below.

TABLE 3

| | Calcium chloride (g) | Magnesium chloride (g) | CMC (g) | Moisture absorption (%) | Viscosity (cps) |
|---|---|---|---|---|---|
| Example 10 | 0.5 | 4.5 | 3 | 420 | 47300 |
| Example 11 | 1 | 9 | 3 | 443 | 25900 |
| Example 12 | 2 | 18 | 3 | 463 | 14200 |
| Example 13 | 4 | 36 | 3 | 487 | 6900 |
| Comparative Example 17 | 5 | 0 | 3 | 365 | 46900 |
| Comparative Example 18 | 10 | 0 | 3 | 382 | 24800 |
| Comparative Example 19 | 20 | 0 | 3 | 402 | 13100 |
| Comparative Example 20 | 40 | 0 | 3 | 414 | 7800 |
| Comparative Example 21 | 0 | 5 | 3 | 376 | 45400 |
| Comparative Example 22 | 0 | 10 | 3 | 397 | 23700 |
| Comparative Example 23 | 0 | 20 | 3 | 423 | 12400 |
| Comparative Example 24 | 0 | 40 | 3 | 442 | 7000 |

Comparing Examples 10 to 13 with Comparative Examples 17 to 24, it is seen that when a total amount of calcium chloride and/or magnesium chloride is at the same level, Examples have high moisture absorption.

In addition, in the case of Examples 10 and 11, when a total amount of calcium chloride and/or magnesium chloride is at the same level, Examples have a viscosity of 25000 or more, and accordingly, it is seen that the gel desiccant is stably prepared.

Desiccants were prepared as follows to observe changes in moisture absorption and viscosity according to the amount of an absorbent polymer.

Example 14

Moisture absorption was determined in the same manner as in Example 10, except that 0.5 g of calcium chloride, 4.5 g of magnesium chloride, and 1 g of CMC were mixed upon preparing a mixture.

Comparative Example 25

Moisture absorption was determined in the same manner as in Example 10, except that 0.5 g of calcium chloride, 4.5 g of magnesium chloride, and 5 g of CMC were mixed upon preparing a mixture.

Comparative Example 26

Moisture absorption was determined in the same manner as in Example 10, except that 0.5 g of calcium chloride, 4.5 g of magnesium chloride, and 10 g of CMC were mixed upon preparing a mixture.

The moisture absorption and viscosity of Examples 10 and 14 and Comparative Examples 25 and 26 are shown in Table 4 below.

TABLE 4

| | Calcium chloride (g) | Magnesium chloride (g) | CMC (g) | Moisture absorption (%) | Viscosity (cps) |
|---|---|---|---|---|---|
| Example 14 | 0.5 | 4.5 | 1 | 445 | 16100 |
| Example 10 | 0.5 | 4.5 | 3 | 420 | 47300 |

TABLE 4-continued

| | Calcium chloride (g) | Magnesium chloride (g) | CMC (g) | Moisture absorption (%) | Viscosity (cps) |
|---|---|---|---|---|---|
| Comparative Example 25 | 0.5 | 4.5 | 5 | 387 | — |
| Comparative Example 26 | 0.5 | 4.5 | 10 | 326 | — |

When it comes to the moisture absorption and viscosity of Examples 10 and 14 and Comparative Examples 25 and 26, Comparative Examples 25 and 26 having a high amount of an absorbent polymer may have a quite high viscosity, but have a rapidly decreasing moisture absorption of less than 400%. Meanwhile, it is seen that Example 14 having a small amount of an absorbent polymer has high moisture absorption and goes through gelation. Example 10, in which a mass ratio of a sum of calcium chloride and magnesium chloride and an absorbent polymer is 100:55 to 100:66, has a viscosity of 40000 or more and has a moisture absorption of 400% or more, indicating the best gel desiccant.

The invention claimed is:

1. A solid desiccant composition comprising:

calcium chloride ($CaCl_2$);

magnesium chloride ($MgCl_2$); and metal oxide, wherein, a mass ratio of the calcium chloride and the magnesium chloride is 1:9, and a mass ratio of a sum of the calcium chloride and the magnesium chloride, and the metal oxide is 1:0.5 to 1:2.

* * * * *